United States Patent [19]

Knight

[11] Patent Number: 5,100,260
[45] Date of Patent: Mar. 31, 1992

[54] CABLE BURYING EQUIPMENT

[75] Inventor: Brian T. Knight, Buckhurst Hill, United Kingdom

[73] Assignee: STC PLC, London, England

[21] Appl. No.: 625,961

[22] Filed: Dec. 11, 1990

[51] Int. Cl.⁵ .............................................. F16L 1/04
[52] U.S. Cl. .................................... 405/167; 405/159; 405/166
[58] Field of Search .............. 405/154, 166, 167, 159, 405/160; 198/861.1, 861.2; 414/745.6

[56] References Cited

U.S. PATENT DOCUMENTS

| | | | |
|---|---|---|---|
| 3,978,677 | 9/1976 | Lochridge | 405/166 |
| 4,101,019 | 7/1978 | Satterwhite | 198/861.1 X |
| 4,312,144 | 1/1982 | Ezoe | 405/159 X |
| 4,749,078 | 6/1988 | Mraz | 198/861.1 X |
| 4,860,878 | 8/1989 | Mraz et al. | 198/861.2 X |

FOREIGN PATENT DOCUMENTS

| | | | |
|---|---|---|---|
| 697090 | 11/1964 | Canada | 405/166 |
| 0025286 | 2/1977 | Japan | 405/166 |
| 895034 | 4/1962 | United Kingdom | 414/745.6 |
| 1117333 | 6/1968 | United Kingdom | . |

Primary Examiner—Dennis L. Taylor
Attorney, Agent, or Firm—Lee, Mann, Smith, McWilliams, Sweeney & Ohlson

[57] ABSTRACT

A cable burying device (3) comprises several heavy hollow tapered elements (7, 8) coupled to each other (7A, 7B, 8A, 8B) to provide limited flexibility, which is towed along the seabed and which digs a trench, the cable (1) passing through the length of the device to become buried in the trench. A guide tube (2) to guide the cable (1) from the ship to the burying device (3) has a flexible lattice construction (FIGS. 6, 7, 8) which can be folded flat for ease of storage on the ship.

4 Claims, 5 Drawing Sheets

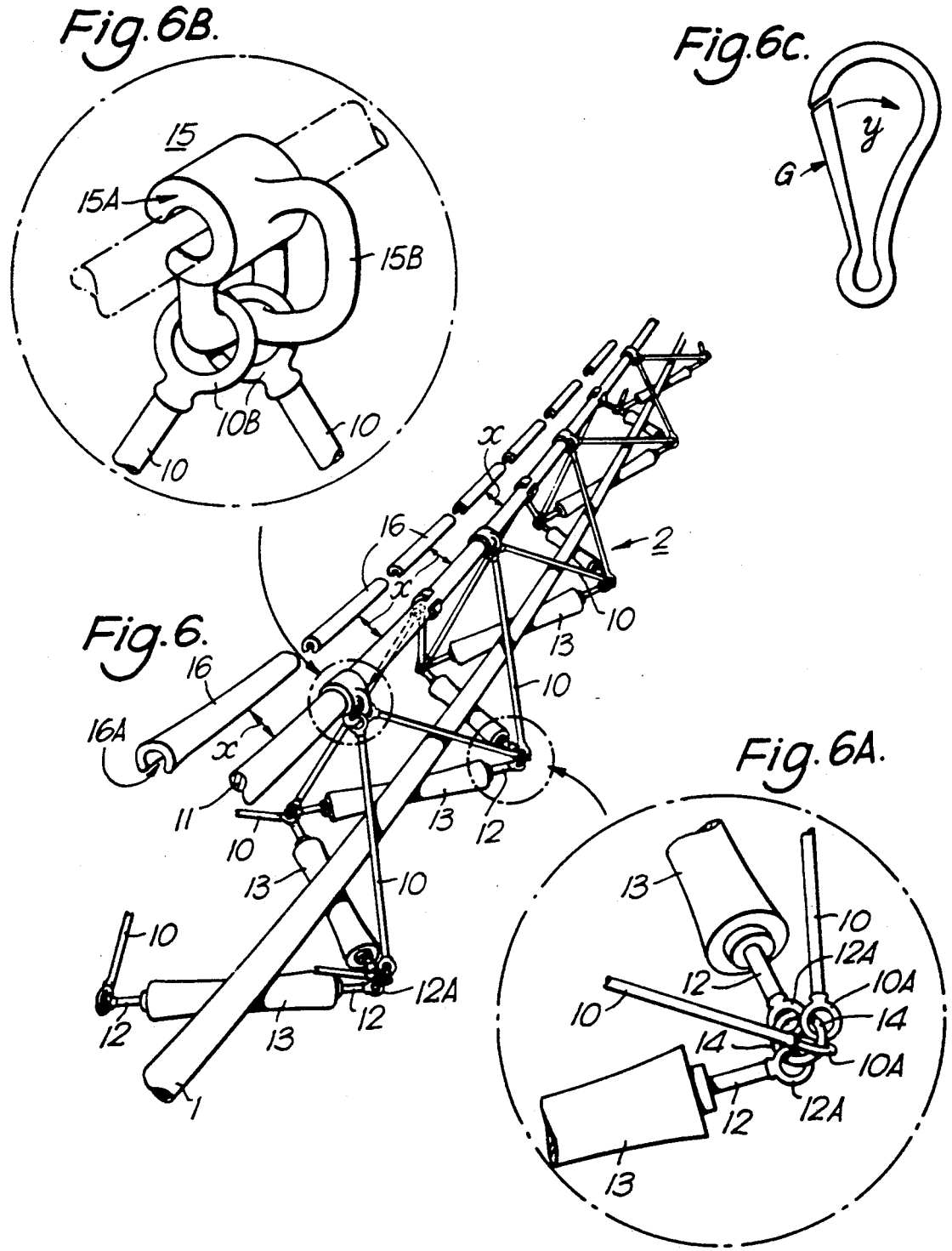

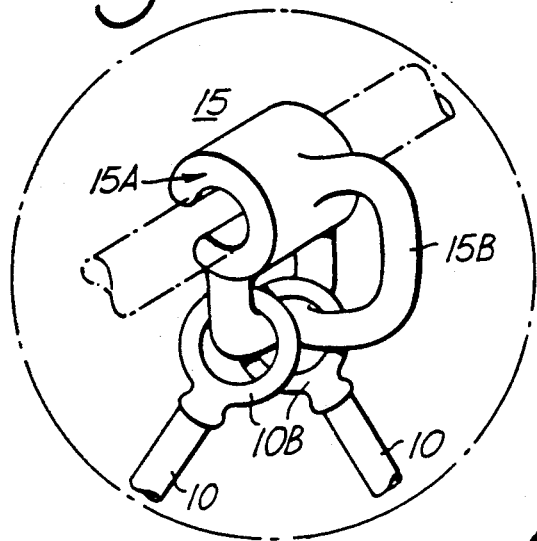
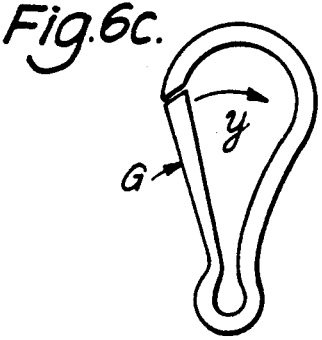
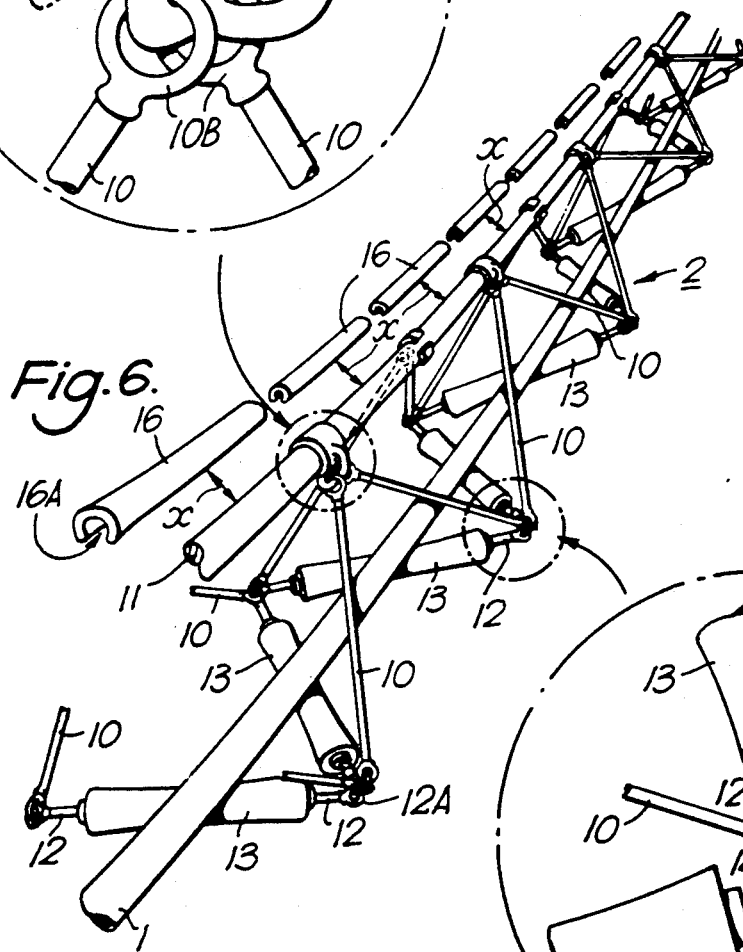
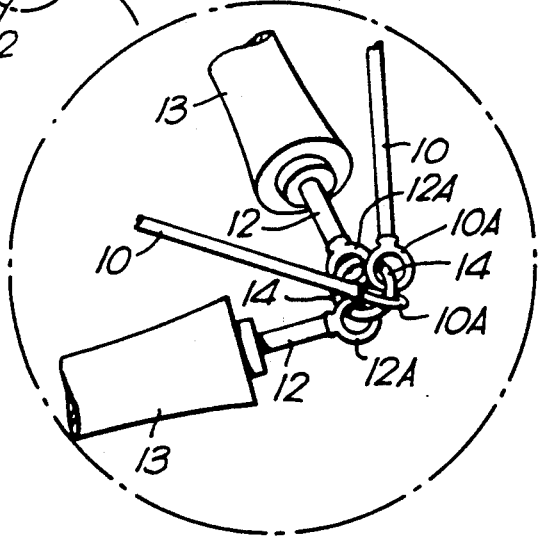

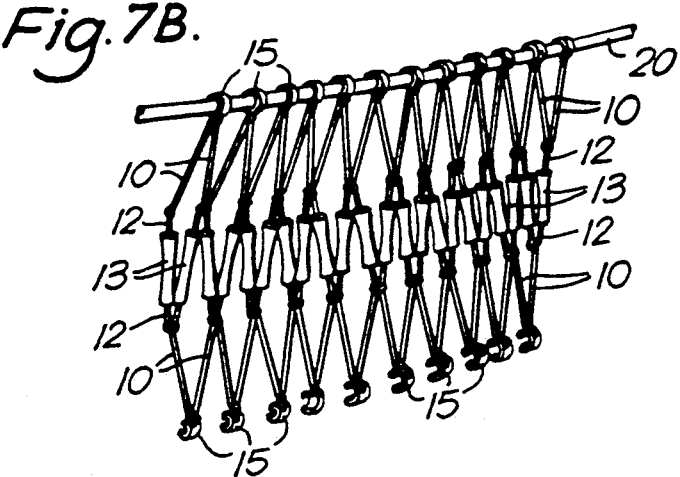
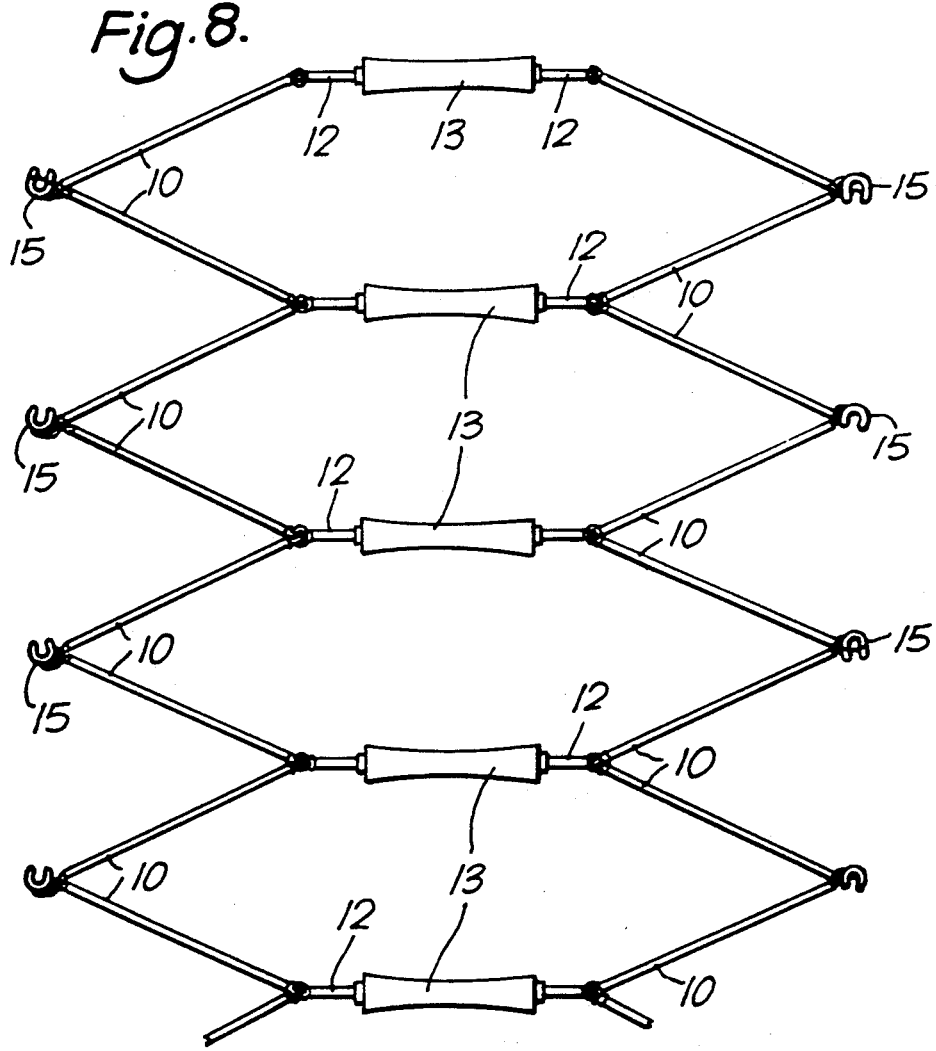

CABLE BURYING EQUIPMENT

This invention relates to cable burying equipment particularly for submarine cables.

BACKGROUND OF THE INVENTION

Burying submarine cables is expensive, requiring as it does a dedicated ship having the necessary equipment, particularly for burying the cable in the seabed. Such equipment conventionally comprises a plough device which requires substantial amounts of power from the ship in order to operate and tow it. For example the plough has an attitude control, controls to lift and lower the plough, television cameras to check if the cable is entering the plough correctly, magnetometer to check if the cable has been properly buried behind the plough, and a depresser arm which lifts and closes when a repeater of the cable link passes through the plough. Such a plough has three lines extending from the ship down to the plough, namely an umbilical cable for the various controls, a tow wire to tow the plough, and it has the cable itself which is to be buried.

One form of plough device for burying cables is discussed in specifcation No. GB-A-1,117,333.

A particular problem that has been experienced with apparatus of this type is that of guiding the cable into the burying device. Conventional guides are bulky and, where a long guide is necessary, presents a significant storage problem on the cable-laying vessel.

It is an object of the invention to minimise or to overcome this disadvantage.

SUMMARY OF THE INVENTION

According to the present invention there is provided a tubular cable guide for guiding a submarine cable from a ship to a cable burying device on the sea bed, the guide comprising a plurality of elements each of which is flexibly coupled to the next and each of which has side hangers by which the element is hung from a tow cable, the elements being foldable from the tubular shape into a flat configuration so that the elements can be easily stored on board the ship.

DESCRIPTION OF PREFERRED EMBODIMENT

In order that the invention can be more clearly understood reference will now be made to the accompanying drawings in which:

FIG. 6 shows in perspective one embodiment of the guide tube 2 of FIG. 1, FIGS. 6A, 6B and 6C being details of FIG. 6 on a large scale;

FIG. 7 shows the tube of FIG. 6 laid out flat, FIGS. 7A and 7B showing how the flat can be further collapsed, and FIG. 8 shows an alternative construction for the tube 2, also in the flat, and similar to the embodiment of FIGS. 6 and 7.

Figure 1:
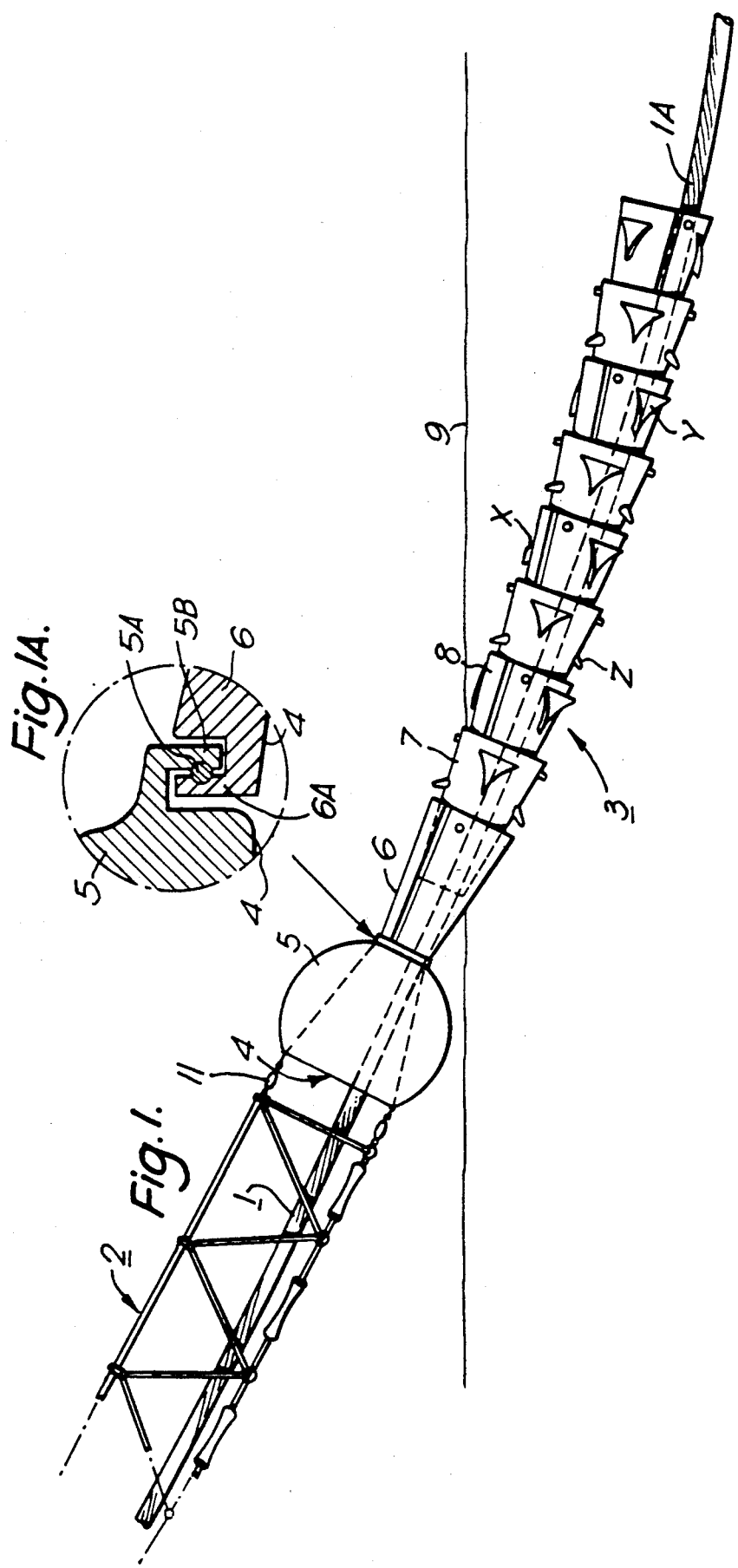
FIG. 1 shows somewhat schematically a cable burying arrangement, the present invention, FIG. 1A showing a detail of FIG. 1.

Referring to FIG. 1 of the drawings a submarine cable 1 is shown passing down a guide tube 2 formed for example of a lattice type framework which guides the cable into a burial device 3.

The tube 2 is towed by a cable-laying ship (not shown) in the direction towards the left as viewed in FIG. 1. The cable enters a bell mouth 4 which comprises a member 5 and a cylindrical tail piece 6 which is coupled to several conically tapered tail members such as 7, 8 etc. These parts are made of heavy steel and as shown in the drawing the submarine cable 1 extends right the way through the parts and out the other end as indicated at 1A.

As shown in FIG. 1 the sea bed indicated as 9 is trenched by the device 3, particularly by the parts 6, 7, 8 etc. as they are towed by the ship. However the bellmouth member 5 is faired or profiled to ride on the surface of the sea bed i.e. not dig into the sea bed, such as a spherical, cylindrical or winged shape. As the cable extends through the centre of the device, it becomes buried below the level of the sea bed 9. The cable 1 is paid out from the ship as the ship proceeds. The member 5 has an annular lift bearing 5A (see Fig 1A) between an annular ring 5B connected to the member 5 and a rim 6A of the member 6. The bearing is arranged so that rotation of the burial parts 6, 7, 8 will not cause the member 5 to roll over.

Figure 2:
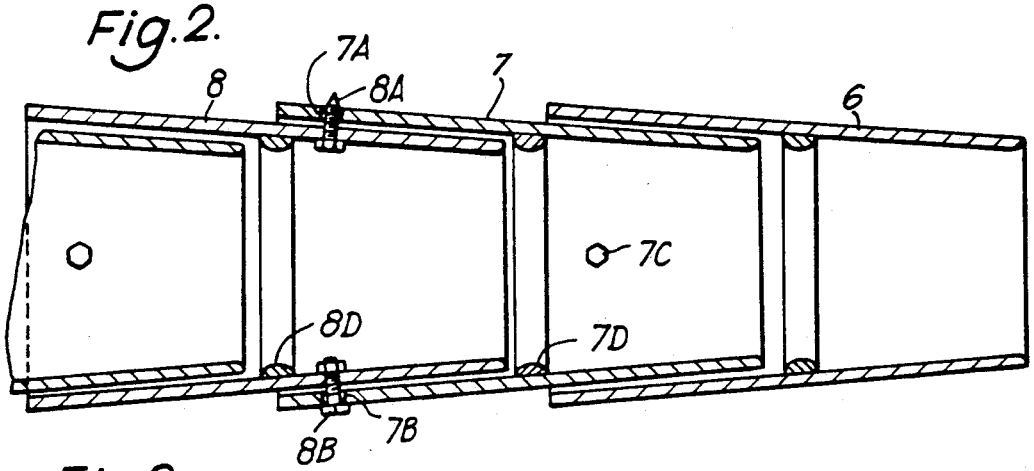
FIG. 2 shows in detail part of the burying arrangement of FIG. 1.
Figure 3:
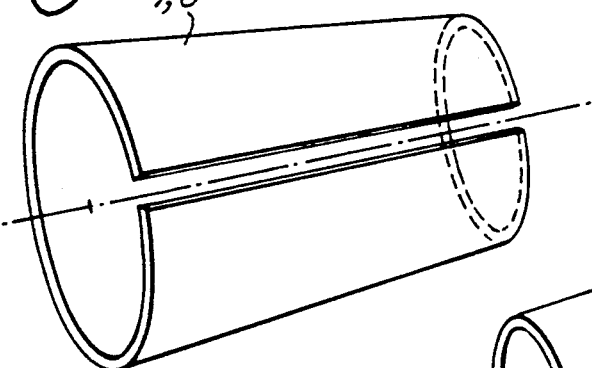
FIG. 3 shows in perspective and somewhat schematically a component part of FIGS. 1 and 2.

Referring now to FIG. 2 there is shown in greater detail and in axial cross section part of the tailpiece 6 and the adjacent parts 7 and 8 of FIG. 1. Each part such as 7 and 8 comprises a bent heavy steel section as shown in FIG. 3 with a longitudinal slot to enable it to be fitted onto the cable prior to laying and ploughing.

Each part such as 7 and 8 is hingedly connected to its adjacent part by means of a pivotal connection 8A and 8B. Each pivotal connection comprises a bolt screwed through the wall of the part such as 8 and locked to that part, and free to rotate in an aperture 7A and 7B of the adjacent part 7. The part 7 is likewise hingedly connected to the adjacent part 6 but the axis of rotation is at 90° and all that is visible in the drawing is the head 7C of the bolt which is screwed through the wall and fixed to the wall of the part 7 and free to rotate in an aperture (not visible) in the adjacent part 6.

Each part such as 7 and 8 has an inner circular ring 7D and 8D made of a low friction material such as Teflon (Trade Mark) to protect the cable 1 against inside sharp edges and protrusions in the burying device.

As one proceeds along the device, each adjacent hinge is at right angles to the previous hinge so that the whole device has limited flexibility like the tail of an animal or a snake.

Although 90° between successive hinges is shown, some other angle would be possible, e.g. 60°.

Figure 4:
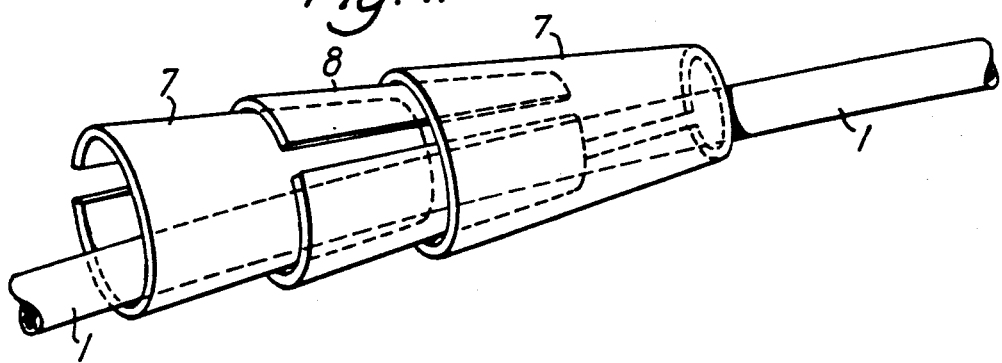
FIG. 4 shows a number of the parts FIG. 3 fitted together, also schematically.

Turning now to FIG. 4 there is shown schematically how the several parts fit into each other and in particular how the slots of FIG. 3 become misaligned with one another once the parts are assembled together so that it is not possible for the cable to come out of the device once the parts are assembled around the cable.

As shown in FIG. 1 each part has a number of projections such as x, y and z which assist the device in digging through the sea bed, FIG. 2 does not show in detail any of the other projecting parts x, y or z, for clarity.

Once again FIG. 4, for clarity, does not shown any of the projections x, y and z.

Figure 5:
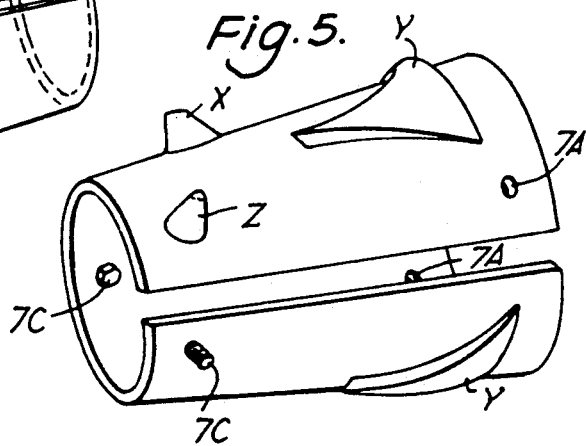
FIG. 5 shows a modification of the part shown in FIGS. 3 and 4.

However FIG. 5 shows in greater detail some of the projections such as x shown in FIG. 1. These projections can be shaped to spread the earth apart as the device proceeds, thereby assisting the digging mechanism of the device.

These projections are tools designed for the particular soil likely to be encountered, for example they may be knives or coulters such as X, for, for example a clay-like soil, a share-like took Y for clay or granular soil, or pegs or sprags Z for breaking e.g. crusted ground. They can be present together or separately i.e. device 3 may be in different forms carrying different tools depending on the soil.

The device operates simply by means of its weight and limited flexibility. The simple dragging along the sea bed surfaces of the device shown in FIG. 1 will by virtue of its weight and limited flexibility, become progressively buried in the sea bed to a depth sufficient to enable the cable to become buried in, for example a depth of approximately 1 meter. The fact that the front of one part 8 fits inside the rear of the preceding part 7 prevents spoil entering the inside of the burial device and tending to clog it up.

Referring now to FIG. 6 there is shown in great detail one form of the tube 2 shown in FIG. 1. Here the tube 2 is formed by individual links such as 10 arranged to be suspended from a towing cable 11 and with connection links such as 12 between them. The links 10 and 12 differ only in that each part 12 has a diabolo-shaped roller such as 13 free to rotate thereon. This ensures that the cable 1 which runs on the rollers does not become biased to one side or the other but remains substantially centrally located between the left and right-hand sides of the tube so formed.

The links 10 and 12 are hingedly connected to each other as shown in great detail in FIG. 6A. Each link such as 10 and 12 has a ring 10A, 12A fixed to it and these rings are linked together by a common link ring 14 so that the links are hingedly connected to each other.

Each link 10 at its other end also has a ring 10B fixed to the end and linked to a snap-on clip 15 made of a tough resilient moulded plastics such as Nylon (Trade Mark). This is shown in greater detail in FIG. 6B The clip has a C-shaped jaw 15A which snaps onto the tow cable 11, a handle 15B to manipulate the clip when clipping it on and off, and a loop 15C connecting the clip to the rings 10B.

As an alternative to the clip 15, a conventional snap shackle could be used (FIG. 6C) which has a gate 9 which opens and closes as indicated by the arrow y.

The clips or shackles when snapped on to the low cable 11 are maintained mutually spaced apart by spacers such as 16 which are of resilient plastics and snap onto the tow cable, having an elongate slot 16A to enable it to be fitted onto the cable 11 sideways as indicated by the arrows x.

The tube 2 when disconnected from the cable 11, can be collapsed and laid flat as shown in FIG. 7. For storage, it can be further collapsed by being extended or closed up like a concertina so that it becomes long like a wire rope (FIG. 7A) or flat like a ribbon (FIG. 7B). It can be wound on a drum or flaked into a container, or hung sideways like a curtain (FIG. 7B) from a convenient storage rail 20 by means of the clips on one side, the opposite clips 15 hanging free below.

FIG. 8 shows an alternative construction for the tube 2. Here the links 12 which support the rollers 13 extend at right angles to the path of the tow cable 11 and the submarine cable 1, but otherwise the construction is the same as described earlier with reference to FIGS. 6 and 7. Also the embodiment of FIG. 8 can be stored in the same way as FIG. 7B but not so easily in the mode shown in FIG. 7A.

As the flat tube is unwound so the support hangers 10A and 10B are brought together at the clamps holes 10C to clamp each support onto the towing cable so that the tube is progressively formed as it is played out over the back of the ship.

It may not be essential to have the rollers such as 13 shown in FIGS. 6, 7 and 8. That is to say the cable may slide easily enough owing to a certain amount of buoyancy once the cable is in the sea.

I claim:

1. A tubular cable guide for guiding a submarine cable form a ship to a cable burying device deployed on the sea bed and coupled to the ship via a tow cable, the cable guide comprising a plurality of first link members hingedly suspended at their one ends from the tow cable via hanger members mounted on the tow cable, a plurality of second link members each hingedly coupling the free arms of adjacent first link members, and rollers one mounted on each said second link members and arranged to engage and support the submarine cable within the guide, and wherein the cable guide includes means for lengthwise collapsing the cable guide when the cable guide is disengaged from the tow cable to facilitate storage on the ship.

2. A guide as claimed in claim 1, wherein the hanger members are, in use, held apart by removable elongate spacer members mounted on the tow cable.

3. A guide as claimed in claim 2, wherein each said roller is diabolo shaped, whereby to maintain the submarine cable to be buried centrally on the roller.

4. A guide as claimed in claim 3, wherein the first link members are coupled to the respective hanger members and second link members via loose fitting rings.

* * * * *